May 25, 1954  P. MORAIN  2,679,296
REGULATOR APPLICABLE FOR HELICOPTER ROTORS
Filed Oct. 5, 1949  3 Sheets-Sheet 1
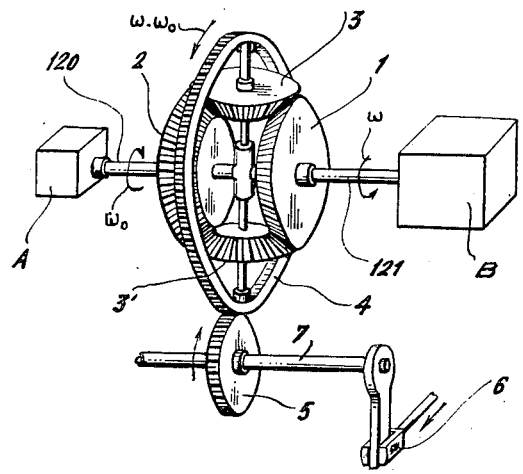
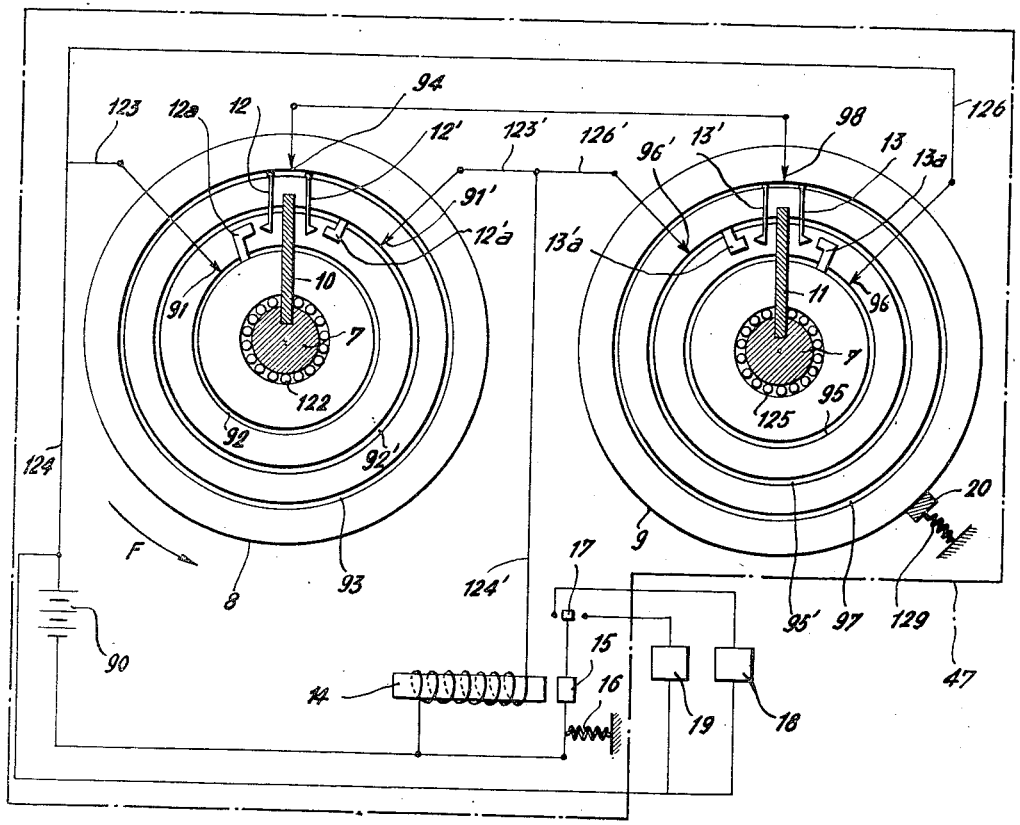
Paul Morain
By Churchill, Rich, Weymouth & Engel
Att'ys.

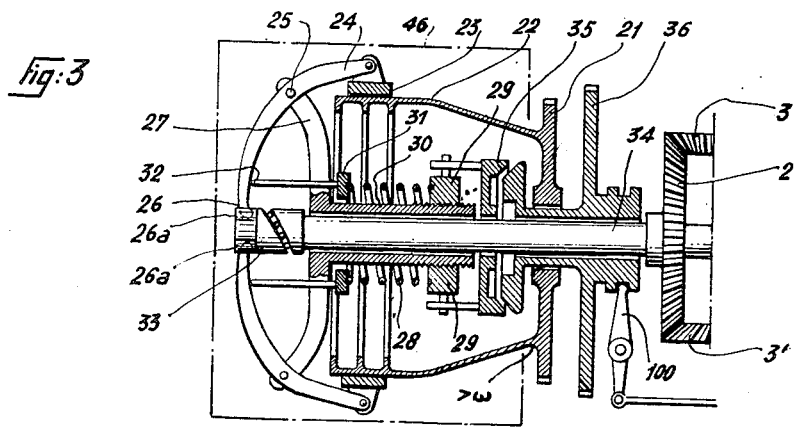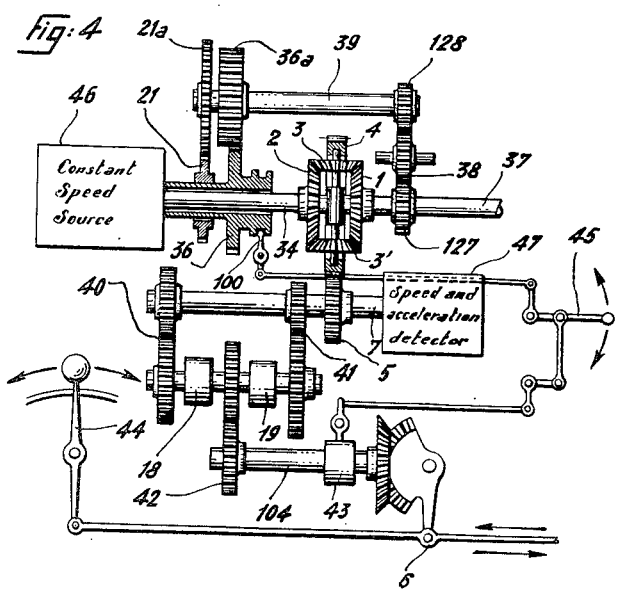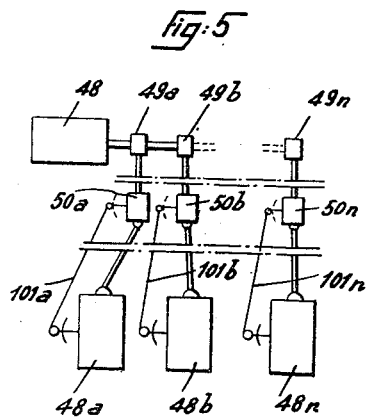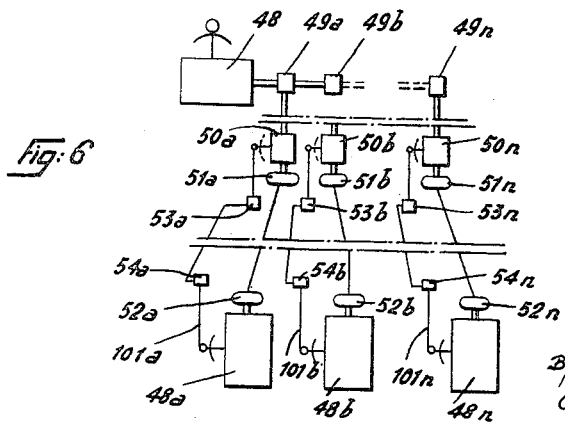

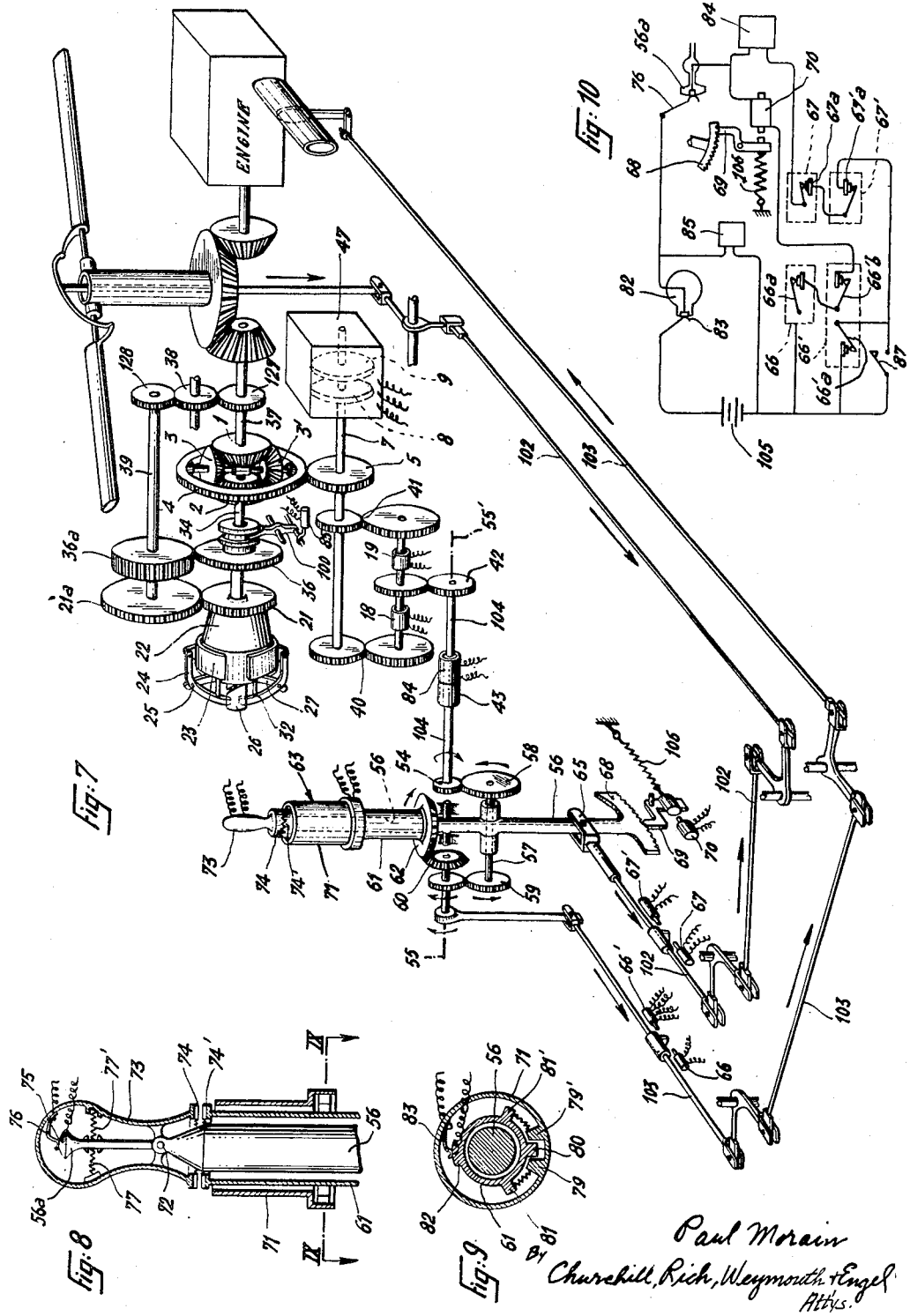

Patented May 25, 1954

2,679,296

UNITED STATES PATENT OFFICE 2,679,296

REGULATOR APPLICABLE FOR HELICOPTER ROTORS

Paul Morain, Paris, France, assignor to Societe Nationale de Constructions Aeronautiques du Sud-Ouest (Societe Anonyme), Paris, France, a company of France Application October 5, 1949, Serial No. 119,631

Claims priority, application France October 14, 1948

10 Claims. (Cl. 170—135.74)

Speed governors are already known which comprise a differential gear train whose sun gears are driven respectively by a shaft rotatively connected to a device the speed of which is to be adjusted, and by a reference speed source, and whose toothed case containing the planet gears is connected to a member controlling the speed of the engine driving said device. Such a governor is described in U. S. Patent No. 2,269,332.

Any difference between the reference speed and the speed to be adjusted causes the differential case to rotate and hence causes an appropriate corrective action on the driving engine.

Although satisfactory in principle, these governors entail however serious drawbacks.

First, such a governor does not by itself provide for any damping and, in the absence of any physical factor causing this damping, it gives rise, after a disturbance, to successive alternating corrections which cause the speed to be adjusted to oscillate indefinitely about its initial value.

Further, the power required for effecting the correction being supplied partly by the above device, and partly by the reference speed source, the load assigned to that source may alter its speed and disturb the action of the governor.

Moreover the use of a reference speed source other than the device to be adjusted, constitutes a drawback.

According to the invention, the speed governor device for a rotary system comprises a differential gear train associated on the one hand with said rotary system and on the other hand with a reference source of constant-velocity rotation, said differential gear train being further associated with a member adapted to move at a velocity corresponding to the differential velocity of said rotary system with respect to said reference source, characterized in that said member is connected to the control means of the rotary system through two mechanical transmissions of different gear ratios each of which is provided with coupling means adapted to be selectively controlled by means responsive to the direction of the acceleration of said member and means responsive to the direction of the velocity thereof, associated with one another, the arrangement being such that the lower gear ratio transmission is coupled when the acceleration and the velocity of said member are of the same sign, and the higher gear ratio transmission is coupled when the acceleration and the velocity of said member are of opposite signs.

This arrangement causes the governor to have a damped period, even when the opposing torque of the device to be adjusted is independent of the speed.

According to a further improvement, the reference source is constituted by a shaft driven by the engine of the device to be adjusted through a friction clutch subjected to the opposed efforts of centrifugal force and of a return spring. This kind of constant speed drive is known. It is often used, for instance, in gramophones for insuring constant-velocity rotation of the record. However, as far as I am aware it has not been proposed up to now to use it as a constant speed source for governors such as those to which the invention refers. However, the constant speed thus achieved is strongly influenced, at any rate temporarily, by the variations of the opposing torque of the shaft the speed of which is kept constant. In order to prevent the regulation energy supplied by this shaft from altering its speed, the driving friction is further subjected to a torque adjusting device, so that this friction becomes more active as the power supplied by the shaft increases and vice versa.

Besides, the action of the friction clutch return spring is made to be automatically adjustable in operation in such a way that, when the speed of the driven device is willingly altered, the speed of the friction driven shaft gets adjusted to that of the device, so that this new adjusted speed may be automatically maintained by the governor.

The invention further includes the application of such improved governors to helicopter rotors, as well as transmission members for this application.

Other features and advantages of the invention will be apparent during the course of the following description.

In the accompanying drawing forming a part of this application and in which like numerals are employed to designate like parts throughout the same, Fig. 1 is a diagram of a known governor.

Fig. 2 is a diagram of the mechanisms and electric circuits which ensure automatically a varying efficiency to the corrector when the acceleration or the speed of the planet gear case changes sign, Fig. 3 shows a friction mechanism according to the invention in which the centrifugal force is balanced by a return spring, Fig. 4 is a general diagram of the governor according to the invention, Figs. 5 and 6 are diagrams relating to the application of the governor to the regulation of a plurality number of engines, Fig. 7 is a perspective general diagram illustrating a rotor-engine control as applied to a helicopter, Fig. 8 is a large scale section of the upper end of the hand control, Fig. 9 is a cross-section taken along line IX—IX of Fig. 8, Fig. 10 is an electric diagram of the network and members connected to the hand control illustrated in Figs. 7 to 9.

Referring to Fig. 1, 120 denotes a shaft which is driven by any suitable source of power diagrammatically shown at A, at a constant angular speed $\omega_0$; 121 denotes another shaft which is driven by any suitable source of power diagrammatically shown at B at an angular speed $\omega$ which it is intended to maintain at the same absolute value as the reference or standard angular speed $\omega_0$.

Operatively interposed between shafts 120, 121 is a control differential system, for example one having bevel gear wheels, which comprises a sun gear 1 fast with shaft 121, another sun gear 2 fast with shaft 120, planet gears 3, 3' meshing with sun gears 1, 2, and a toothed case 4 which pivotally supports said planet gears. Meshing with case 4 is a gear illustrated as a toothed wheel 5, for displacing a lever 6 which acts on a member (not shown) controlling the driving torque of the driven device and adjusting the speed of shaft 121.

It will be seen that if $\omega=\omega_0$ in absolute value, planet wheels 3 and 3' rotate about their axes without driving case 4; but if, for example, $\omega$ is greater than $\omega_0$, case 4 is at once driven in the direction of the arrow at an angular speed $\omega-\omega_0$ and acts in the proper direction through lever 6 on the torque control member (not shown) at a speed proportional to $\omega-\omega_0$, thereby providing a very sensitive and powerful governor. The lever 6 may act on the control member either directly or through an auxiliary motor of any known type. It appears at once that it is a delicate problem to secure for sun gear 2 a sufficiently constant angular speed $\omega_0$ for achieving the sensitiveness required from the governor, by means of a torque capable of moving the adjusting members without affecting the constancy of said speed.

In addition to the above difficulty which is readily apparent, a governor of the type described with reference to Fig. 1 has a serious drawback The correction which is effected through the action of lever 6 on the speed of the shaft 121 exceeds that which would be sufficient for ensuring rotation at the speed of shaft 120. In other words, when $\omega$ decreases, the lever 6 will move so as to cause an acceleration of shaft 121; but the resulting increase in speed will not be stopped when this shaft reaches the speed $\omega_0$ since, up to that moment, the lever 6 has continued moving in the same direction. Therefore the speed of 121 starts exceeding $\omega_0$ and the lever 6 is then driven in the opposite direction with the result that shaft 121 slows down. But again, its speed will decrease beyond $\omega_0$ and the lever 6 will move again in the initial direction, and so on. Thus the governor "hunts" indefinitely with a certain period and amplitude.

The present invention has for its object to insert on shaft 7, between the differential gearing 1—2—3—4—5 and the controlling member 6, a transmission gearing so designed that it will cause a damping action, thus avoiding the hunting phenomenon.

This transmission gearing includes two branches or paths which are alternately operated, these branches having different gear ratios and being controlled by a device which throws into gear one of them while it throws the other out of gear.

The device for making gear ratio changes must be operated whenever any one of the variables $$\frac{d\omega}{dt}$$

or $\omega-\omega_0$ changes its algebraical sign, i. e. whenever the acceleration or the speed of case 4 changes its sign. The variables $$\frac{d\omega}{dt}$$

and $\omega-\omega_0$ may be expressed as the equivalents of the directional components of the acceleration and velocity respectively. This device may be designed as will be explained with reference to Fig. 2.

Fig. 2 diagrammatically shows an acceleration detector and a rotation direction detector developed side by side. Actually both these detectors are arranged on a same shaft 7, the movement of which depends on that of the planet gear case 4, preferably with a gear step-up to provide for a more sensitive detection.

The acceleration detector comprises a disk 8 very freely mounted on shaft 7 (for example through a ball bearing 122), having a relatively high mass inertia and provided with a pair of resilient contact strips 12, 12' adapted to cooperate with either of two non-resilient contact studs 12a, 12'a angularly spaced-apart on disk 8, when pushed by a finger 10 fast with shaft 7; as contact studs 12a, 12'a are not resilient, they further provide abutments which, together with finger 10, cause disk 8 to be driven round by shaft 7.

Brushes 91, 91' in contact with ring conductors 92, 92' respectively are connected to a source of electric current 90 through wires 123, 124 and 123', 124' respectively, while resilient contact strips 12, 12' are connected to a ring conductor 93 with which a brush 94 is arranged to cooperate.

The rotation direction detector comprises a disk 9 having a relatively slight inertia, also very freely mounted on shaft 7 (for example through a ball bearing 125) and subjected to friction due to a brake-shoe 20 urged by a spring 129 fixed on a stationary part, for example the detector casing. Disk 9 carries a pair of resilient contact strips 13, 13' adapted to cooperate respectively with non-resilient contact studs 13a, 13'a when pushed by a finger 11 fast with shaft 7; being non-resilient, studs 13a, 13'a provide abutments which together with finger 11, cause disk 9 to be driven round by shaft 7.

Brushes 96, 96' connected to source 90 through wires 126, 126' are in contact with ring conductors 95, 95' respectively energizing studs 13a, 13'a, while resilient contact strips 13, 13' are connected to a ring conductor 97 with which a brush 98 is arranged to cooperate.

The switches formed by contacts 12, 12a and the like, are inserted in an electric circuit (diagrammatically shown on Fig. 2) comprising an electromagnetic relay 14; the armature 15 of this electro-magnet is urged away therefrom by a spring 16 and operates a two-way switch 17 to energize either an electro-magnetic clutch 18 mounted on one of the branches of the transmission gearing (small gear-ratio between the planet gear case and the driving torque control) or an electro-magnetic clutch 19 mounted on the other branch of the transmission gearing (large gear ratio between the planet gear case and the driving torque control).

Let us assume that a disturbance in the opposing torque causes angular speed $\omega$ to decrease;

the planet gear case starts to rotate with a speed $\omega_0 - \omega$, driving shaft 7 in a direction supposed to be that shown by the arrow F on Fig. 2. Owing to inertia, disk 8 has a tendency to remain stationary but finger 10 pushes strip 12 to contact with stud 12a. Likewise disk 9 subjected to the friction of shoe 20 tends to remain stationary, but finger 11 pushes strip 13' to contact with stud 13'a, thus closing the circuit as switches 12—12a and 13'—13'a are in series with 90. Hence electro-magnet 14 is energized and switch 17 closes the energizing circuit of electro-magnetic clutch 18 which corresponds to the greater power of the governor. This action lasts as long as shaft 7 is accelerated, i. e., as long as its velocity $(\omega_0 - \omega)$ increases.

As soon as the acceleration is reversed, i. e., it starts acting in the opposite direction, the velocity of shaft 7 stops increasing and starts decreasing, the direction of rotation remaining still unchanged. But disk 8, by reason of inertia, tends to keep the same speed and finger 10 moves apart from strip 12 thus breaking the circuit. It then pushes strip 12' to contact stud 12'a. On the contrary, as the rotation direction has not changed, finger 11 remains in contact with strip 13' on disk 9. The electro-magnet 14 is not energized any longer, and switch 17 opens the energizing circuit of clutch 18 while closing the energizing circuit of clutch 19, corresponding to the smaller power of the governor.

When the velocity $(\omega_0 - \omega)$ of shaft 7, after reaching zero, starts increasing again (but in the opposite direction which now coincides with that of the acceleration), the high-inertia disk 8 causes finger 10 to remain in contact with strip 12', but finger 11 pushes strip 13 to contact stud 13a; hence magnet 14 is again energized since switches 12'—12'a and 13—13a are in series with 90. Therefore clutch 19 is no longer energized and clutch 18 is energized again.

Lastly, as soon as the acceleration is again reversed, i. e., it starts acting in the initial direction, the velocity of shaft 7 after reaching a new maximum value, starts decreasing while its direction of rotation is unchanged (now opposite to that of the acceleration). This causes finger 10 to slow down relatively to the high-inertia disk 8; contact 12'—12'a is broken and contact 12—12a is closed (contact 13—13a remaining unaffected since the direction of rotation is the same). Thus clutch 18 is deenergized while clutch 19 is energized.

To summarize, clutch 18 will be energized every time switches 12—12a and 13'—13'a or switches 12'—12'a and 13—13a are simultaneously closed, i. e., every time the velocity of shaft 7 tends to increase whether it rotates in one direction or the other, or in other words the acceleration acts in the same direction as that of rotation. On the other hand, clutch 19 will be energized every time the velocity of shaft 7 tends to decrease whatever its direction, or in other words every time the acceleration acts in the direction opposite to that of rotation.

It will readily be understood that the speed and acceleration detecting device just described operates correctly whatever the direction of initial difference $\omega - \omega_0$. In other words, it is always the greater power of the governor which is first operated.

It is to be noted, as a result, that the greater power of the governor is used while the lag between the controlled member and the reference member increases, whereas the smaller power of the governor is used while this lag decreases. That is to say, the regulator reacts vigorously in the former case, but mildly in the latter one.

The clearance between fingers 10, 11 and the corresponding strips 12, 12', 13, 13' may be very small, so as to cause but a negligible lag in the control. The brushes associated to the rings of disk 9 may conveniently be employed as braking members instead of a separate brake-shoe 20. As a matter of fact, all brushes and ring conductors may be grouped in association with disk 9, and flexible conductors may be provided to connect disk 9 to contact members on disk 8 because the maximum angular shift between disks 8 and 9 is not greater than the maximum angular clearance between contact elements 12, 12' and 13, 13'.

With a view to obtaining a constant reference speed $\omega_0$ from the device running at a variable speed $\omega$ to be adjusted, a construction as shown on Fig. 3 may be employed. It is known that in a friction clutch, the centrifugal force is balanced by the action of a spring. Such a clutch is satisfactory as long as the opposing torque from the frictionally driven shaft is constant or varies but slowly. When the opposing torque varies suddenly, as in the case with the present governor where, through the differential, a part of the torque required for operating the power control is supplied by the constant speed shaft, the driven shaft must be subjected to a considerable speed change in order that a substantial variation of centrifugal force alters the friction force in the clutch in the proper direction.

Shaft 34 whose angular speed is to be maintained constant by means to be described subsequently is connected to sun gear 2. A clutch drum 22 is integral with a toothed wheel 21 driven by the shaft whose speed is to be controlled, through a step-up gearing having a ratio such that the minimum velocity of the toothed wheel 21 is always greater than the constant reference speed of the shaft 34. This is done in order to take into account the creeping of the clutches 23 over the drum 22.

Clutch shoes 23 are pivotally supported on levers 24, the pivot pins 25 of which are carried by arms 27 fast with a tubular shaft or sleeve 30 coaxial with shaft 34. A spring 28 backed by a nut 29 screwed on shaft 30 acts through a ring 31 and pins 32 on the arms of levers 24 remote from those which carry shoes 23. The ends of levers 24 proximate to pins 32 engage axial grooves 26a in one of the races of a helical thrust ball bearing 33. Accordingly, neglecting any angular shift imposed by thrust bearing 33, shafts 30 and 34 revolve at the same angular speed.

Let us first assume that the opposing torque on shaft 34 is small or nil. The centrifugal force developed by the combination of levers 24 and shoes 23 is balanced by spring 28 and the pressure of said shoes on drum 22. The friction in the clutch is just great enough to drive the combination of levers and shafts 30, 34 at the speed $\omega_0$ for which balance takes place. Let us now suppose that a considerable opposing torque occurs on shaft 34. The helical thrust bearing 33 (whose pitch is suitably selected with respect to the direction of rotation of shaft 34) will develop a thrust on the end 26 of levers 24, resulting in an additional pressure of shoes 23 on drum 22. The product of the additional pressure by the friction coefficient sets up an additional torque which, with a suitable leverage, exactly balances the opposing torque on shaft 34. The speed will thus remain undisturbed by any variation of opposing torque.

Furthermore nut 29 which adjusts the tension of spring 28 is fast with one of the elements of a clutch 35, the other one being fast with a toothed wheel 36. If clutch 35 is shifted to operating position, for example by axially shifting wheel 36 by means of lever 100, and the toothed wheel is rotated at a speed $\omega_1$, it will be seen that, with a properly selected pitch for nut 29, the adjustment of spring 28 is altered until shaft 34 revolves at speed $\omega_1$. If $\omega_1$ is greater than $\omega_0$, the movement of nut 29 increases the tension of spring 28 and consequently the friction of shoes 23; on the contrary if $\omega_1$ is smaller than $\omega_0$, the tension of spring 28 and the friction decrease. Consequently an easy adjustment of the speed is obtained. If, in particular, at the time when the governor is uncoupled, clutch 35 is thrown into gear and the adjustment of the driven mechanism is manually altered, toothed wheel 36 revolving at the speed $\omega$, these operations will result in automatic alteration of the tension of spring 28 in order that, when the governor is coupled again, the speed maintained automatically by the governor will be the same as obtained by manual adjustment, when the latter is replaced by that of the governor.

The various above described members may be grouped, by way of example, as diagrammatically shown on Fig. 4.

Keyed on a shaft 37 rotating at the angular speed $\omega$ to be controlled, is the sun wheel 1. Through a toothed wheel 127 thereon, an intermediate pinion 38, and a toothed wheel 128 keyed on a shaft 39, shaft 37 drives said shaft 39 which in turn drives toothed wheels 21 and 30 of the constant speed clutch device 46 shown in detail in Fig. 3 through pinion 21a and 37a, respectively. The planet gear case comprises a toothed ring 4 driving (preferably through a step up gearing) shaft 7 of the device 47 (shown in detail on Figure 2) comprising acceleration and rotation direction detectors 8—9. Two pairs of gears 40, 41 with different gear ratios are provided to drive toothed wheel 42 through clutch 18 or clutch 19 at two different angular speeds with respect to the planet gear case. A clutch 43 is provided to cause the governor to act or not to act on lever 6 for adjusting the power of the engine. Clutch 43 is operated by means of a lever 45 which is further connected through a lever 100 to toothed wheel 36 adapted to adjust the tension of spring 28 (Fig. 3).

When the governor is uncoupled, by the clutch 43, the gear 36 is connected to the constant-speed clutch adjustment and vice-versa. Furthermore, clutch 43 being out of gear, a lever 44 enables lever 6 to be adjusted manually in order to obtain the desired speed. Eventually the tension of spring 28 is auomatically adjusted so that said speed is maintained by the action of the governor when the latter is coupled again.

A governor system arranged according to this invention, is particularly suited for synchronizing several motors or engines remote and separate from one another, by applying only weak torque transmission means for which non-mechanical means may in fact be substituted.

Referring to Fig. 5, a pilot engine or motor 48 which may merely be an adjustable speed motor, simply adapted to supply governors with the required power regulates motors 48a, 48b, 48n to be adjusted. Through transmission devices 49a, 49b, 49n, the constant speed sun gears of governors 50a, 50b, 50n instead of being driven by constant speed clutches (that are now omitted) are driven by the pilot engine 48. The other sun gears of each differential couple are driven by the engines or motors to be adjusted, and each governor acts through a gearing 101a, 101b, 101n on the corresponding engine.

Motors 51a, 51b, 51n controlling the varying speed sun gears, have been added in Fig. 6. These motors are synchronized with generators 52a, 52b, 52n which are operated by the engines 48a, 48b to be adjusted and connected to them through a transmission which may be electrical. Similarly, the linkages starting at the governors operate servo-motors whose transmissions 53a, 53b, 53n control, for instance electrically, receivers 54a, 54b, 54n acting on gearings 101a, 101b, 101n of the engines. It may thus be seen that there remains no mechanical link with the engines to be adjusted.

A governor arranged according to the invention is particularly well adapted to the regulation of the speed of helicopter rotors. The thrust of the rotor which balances the weight of the aircraft is proportional, for a given pitch of the blades, to the square of the speed. The opposing torque balanced by the driving torque is also proportional to the square of the speed. In order to control vertical displacements, it is thus possible to act either on the pitch, the speed remaining constant, or on the speed, the pitch remaining constant. The first alternative is preferable since by acting on the speed, the response is less immediate owing to the inertia of the rotor. Besides, the speed of the rotor can only vary within narrow limits owing to centrifugal force and to the mechanical strength of the rotor.

Control through pitch variations therefore requires simultaneously a very accurate adjustment of the driving torque in order to keep the speed constant. It is impossible to render this adjustment sufficiently accurate by a mere combination of controls. A very accurate governor must complete the action of this combination. Moreover, the governor must meet any disturbance in the driving torque and automatically decrease the pitch in order to ensure self rotation in case of failure.

As described hereafter, it will be seen how a governor according to the invention, completed by particular control devices, may perfectly solve the problem set.

Fig. 7 shows such a rotor-engine control as applied to a helicopter. In this case, the controls of clutch 43 and of clutch 35 (Fig. 3) associated with lever 100 and pinion 36, are not mechanically coupled through a linkage 45 as in Fig. 4, but are independently actuated by electromagnetic devices 84 and 85, respectively. Electromagnetic device 84 is adapted, when energized, to throw clutch 43 into gear, whereas electromagnetic device 85 is adapted to move pinion 36 into clutching position when deenergized.

The pitch and torque control members include a lever 56 pivotally mounted about a transverse axis 55—55' which controls through fork 65, the pitch control transmission 102. The direction of the arrows is, for instance, that which decreases the pitch. A hollow shaft 61 may rotate coaxially around the longitudinal axis of the pitch control lever; this shaft 61 drives the driving torque control transmission 103, through bevel pinions 62 and 60 (the axis of the latter lying along 55—55'). The direction of the arrows is that which decreases the driving torque. It may be seen for instance, provided shaft 61 is secured against rotation relatively to lever 56, that to decrease the pitch causes the driving torque to decrease. Thus a mechanical combination of the pitch and driving torque control transmission, is effected.

The exit shaft 104 of the governor (Figs. 4 and 7) ends with a pinion 54 whose axis lies also along 55—55'. The direction of the arrow is that corresponding to a decrease in the driving torque. The shaft 37 associated with the governor is connected to the rotor of the helicopter. The movement of pinion 54 is transmitted to the controls through epicycloidal gears 58 and 59 keyed to a shaft 57 rotating inside lever 56 parallel to axis 55—55', pinions 54 and 60 and the pinions 58 and 59 forming an epicycloidal gear train. It may be seen that, provided the pitch control lever 56 is secured against pivoting (by locking means to be described hereafter) and provided the pinion 60 is free to rotate, the pinion 54 (rotating in the direction of the arrow) will cause the driving torque control gearing 103 to be displaced in the direction of the arrow, i. e., in the direction corresponding to a decrease in the driving torque. If, on the contrary, the pinion 60 is prevented from rotating (owing to abutments 66 or 66' to be described hereafter) while the pitch control lever is allowed to pivot, the pinion 54 will cause the pitch control gearing 102 to be displaced in the direction opposite to that of the arrow, i. e., in the direction corresponding to an increase in pitch or, in other words, to an increase in the opposing torque. Thus the governor may act either on the driving torque, or on the opposing torque, but it will be seen hereafter that the governor normally acts on the driving torque, and it is only when it can no longer increase the torque that it interferes for reducing the pitch so as to reduce the opposing torque.

The head 63 of the pitch lever 56 is shown in detail in Fig. 8 which is an axial section along a plane perpendicular to the rotation axis 55—55', and in Fig. 9 which is a cross-section of this head 63.

Around the torque control hollow shaft 61, a handle 71 may rotate, its angular displacement relatively to this shaft is limited by finger 80 and abutments 79 and 79'. Two springs arranged between abutments 79 and 79' and fingers 81 and 81' urge handle 71 to a mean fixed position relatively to shaft 61. In this position, an electric contact is established between brush 83 secured to the handle and the terminal of a sector 82 integral with shaft 61. Thus as soon as shaft 61 is rotated in either direction by means of handle 71, the electric contact breaks and is reestablished when the handle is released.

The pitch lever 56 comprises further a pitch control handle 73 pivotally mounted about an axle 72 parallel to axis 55—55' and whose angular displacement is limited by the clearance between a finely toothed ring 74 secured to the lower part of handle 73 and another symmetrical ring 74' secured to the upper part of hollow shaft 61. Two springs 77 and 77' urge handle 73 in a mean fixed position relatively to lever 56 and to shaft 61. In this position, an electric contact is established between brush 76 secured to handle 73 and the terminal of a sector 75 integral with an extension 56a of lever 56. Thus, when pivoting handle 73 in either direction for altering the pitch of the rotor, the toothed rings 74 and 74' are thrown into gear, thus securing against rotation shaft 61 with respect to lever 56, and the torque control transmission is driven by the pitch lever simultaneously with the pitch transmission, thus achieving the desired mechanical combination. At the same time, the electric contacts 76—56a is broken. When handle 73 is released, shaft 61 is free to rotate and the electric contact is reestablished.

Lastly, lever 56 may be secured by means of a dog 69 cooperating with a toothed sector 68; when electromagnet 70 is energized, this dog engages sector 68.

Fig. 10 is a diagram of the network connecting the previous device and electromagnets 84 and 85 controlling respectively the throwing into gear of the governor and of the device altering the tension of the constant speed clutch spring. The same reference numbers are used as in Figs. 7, 8 and 9. Mechanical forming electric contacts 66 and 66' are arranged on the driving torque control transmission 103, corresponding to the maximum and minimum torques which may be achieved. When transmission 103 abuts, electric contacts 66a on the one hand, 66'a and 66'b on the other hand, are broken. Similar abutments 67 and 67' forming electric contacts 67a and 67'a are arranged on the pitch control transmission 102. A source 105 feeds these circuits. Lastly, the pilot may operate a switch 87 controlling the circuit of electromagnet 84. The control circuit of this electromagnet comprises in series contacts 82, 83 of handle 71 and contacts 76, 56a of handle 73. The circuit of electromagnet 85 is directly closed by contacts 82, 83.

If either the driving torque control handle 71 is operated, or the pitch control handle 73, the electromagnet 84 is deenergized and the governor which is controlled thereby is thrown out of gear so that it is possible to alter at will the speed of the rotor or the pitch of its blades.

If the torque control handle 71 is operated, the electromagnet 85 controlling the device altering the tension of the spring of the constant speed clutch is deenergized, and hence it alters the adjustment of the speed to the desired value.

As soon as the pitch control handle 73 is operated, besides mechanically securing shaft 61 against rotation, electromagnet 70 being no longer energized, spring 106 unlocks sector 68 by acting on dog 69 and the pitch control lever is unlocked.

As soon as the torque control gearing 103 meets either of abutments 66 or 66', the pitch control lever is also unlocked. Furthermore, in the case abutment occurs at 66' (maximum torque), besides the contact 66'b, a further contact 66'a is opened.

Lastly as soon as the pitch control transmission 102 meets either of abutments 67 or 67', the governor is thrown out of gear.

Let the helicopter be flying, the governor ensuring a convenient and constant rate to the rotor. As soon as the pilot acts on the pitch control handle 73 for a vertical motion, he automatically unlocks the pitch control and secures shaft 61 and pinion 62 to this lever. The variation of the pitch causes a mechanical balancing of the couple. The governor is thrown out of gear and leaves complete driving freedom. As soon as this action stops, the pitch control lever is locked, pinion 62 is loosened and the governor completes adjusting the torque to the value required for ensuring the steadiness of the speed.

If the pilot wishes to alter this speed, by acting on the torque control handle 71, he throws the governor out of gear and engages the adjusting device of the constant speed clutch, while altering simultaneously by the desired amount the torque adjustment. When he releases the handle, the governor is, at the same time, engaged and adjusted for keeping constant the new speed existing at the moment of the last engaging.

If, during automatic adjustment, the torque control transmission acts on either of the abutments 66 or 66', this transmission becomes secured against motion, the pitch control lever is unlocked and the governor acts on this lever and the pitch control transmission for maintaining the speed constant. This action may be geared down in a convenient ratio relatively to the action on the torque, by the appropriate choice of the gear-ratio of epicycloidal train 54—58—59—60. This possibility occurs in particular in case of engine failure. The pitch is then decreased until the adjusting rate is reached in self-rotation.

If, when the governor acts on the pitch, the abutments of the pitch control transmission are reached, the governor is thrown out of gear so as to avoid injury to the mechanism.

The operation just described is possible during a normal flight far from the ground since, in this case, switch 87 is closed by the pilot.

On the contrary, during a flight near ground level, switch 87 will remain open. If an engine failure then occurs, the torque control transmission 103 will abut (both owing to the reflex action of the pilot and to the effect of the governor) against the stop 66' in the position of maximum torque. This causes contacts 66'a and 66'b to open, and thus, the pitch control is unlocked, but the governor is simultaneously thrown out of gear, so that this governor cannot, as in normal flight, impose a decrease in pitch down to self-rotation rate, thus avoiding a sudden decrease in the lift which is particularly dangerous when the aircraft is near the ground.

It may be noticed that any action of the pilot on the pitch or on the torque automatically throws out of gear the governor, and that any action on the torque control handle (even during self-rotation) enables the pilot to alter the value of the constant speed which the governor is to keep.

I claim:

1. A speed responsive device for adjusting control means of the speed of a rotary system, comprising a reference source of constant-velocity rotation; a differential gear train associated on the one hand with said rotary system, and on the other hand with said reference source; a shaft cooperating with said differential gear train, adapted to rotate at a velocity corresponding to the differential velocity of said rotary system with respect to said reference source; two mechanical transmissions of different gear ratios between said shaft and said control means; an electrically operated clutch in each of said transmissions; a source of electric current connected to said clutches; a two-way switch between said source of electric current and said clutches, for selectively engaging said clutches; an electromagnetic relay for controlling said switch, said relay being adapted, when energized, to switch on the clutch in the lower gear ratio transmission and, when deenergized, to switch on the clutch in the higher gear ratio transmission; an energizing circuit associated with said relay; a disk of relatively high inertia and a disk of relatively low inertia, both mounted for free rotation relatively to said shaft; a first switch in said circuit, including a resilient strip cooperating with a stop, both carried by said high-inertia disk; a second switch in said circuit, including a resilient strip cooperating with a stop, both carried by said high-inertia disk, said resilient strips being spaced from and adjacent to one another; a member secured against rotation relatively to said shaft and extending between said resilient strips, said member being adapted to urge either of said strips into contact with the respective stop and to drive the high-inertia disk in the corresponding direction; a third switch in said circuit, in series with said first switch, including a resilient strip cooperating with a stop, both carried by said low-inertia disk, the sequence of said first and last-mentioned resilient strips and stops being the same in a same direction around the shaft; a fourth switch in said circuit, in series with said second switch, including a resilient strip cooperating with a stop, both carried by said low-inertia disk, said third and fourth-mentioned resilient strips being spaced from and adjacent to one another; and a member secured against rotation relatively to said shaft and extending between said third and fourth-mentioned resilient strips, said latter-mentioned member being adapted to urge either of said latter-mentioned resilient strips into contact with the respective stop and to drive the low-inertia disk in the corresponding direction.

2. A speed responsive device according to claim 1, further comprising braking means associated with the low-inertia disk for increasing responsiveness thereof to the velocity of the shaft.

3. A speed responsive device for adjusting control means of the speed of a rotary system, comprising a reference source of constant-velocity rotation; a differential gear train associated on the one hand with said rotary system, and on the other hand with said reference source; a member cooperating with said differential gear train, adapted to move at a velocity corresponding to the differential velocity of said rotary system with respect to said reference source; two mechanical transmissions of different gear ratios between said member and said control means; a clutch in each of said transmissions; and clutch control means responsive to the directional components of the acceleration and velocity of said member for coupling the lower gear ratio transmission when said directional components of the acceleration and velocity of said member are in the same direction, and for coupling the higher gear ratio transmission when said directional components of the acceleration and velocity of said member are in the opposite direction.

4. A speed responsive device for adjusting control means of the speed of a rotary system, comprising a reference source of constant-velocity rotation; a differential gear train associated on the one hand with said rotary system, and on the other hand with said reference source; a member cooperating with said differential gear train, adapted to move at a velocity corresponding to the differential velocity of said rotary system with respect to said reference source; two mechanical transmissions of different gear ratios between said member and said control means; an electrically operated clutch in each of said transmissions; individual energizing means for said clutches; switching means for selectively controlling said energizing means; and switch control means responsive to the directional components of the acceleration and velocity of said member for switching on the energizing means of the clutch in the lower gear ratio transmission when said directional components of the acceleration and velocity of said member are in the same direction, and for switching on the energizing means of the clutch in the higher gear ratio transmission when the said directional components of the acceleration and velocity of said member are in the opposite direction.

5. A device according to claim 4, wherein the member is a shaft adapted to rotate at a velocity corresponding to the said differential velocity, wherein the switching means comprise two mechanically independent groups of switches adapted to selectively control the energizing means, and wherein the switch control means comprise a disk of relatively high inertia mounted for free rotation relatively to said shaft, and adapted to control one of said groups of switches; abutting means on said disk; a member secured against rotation relatively to said shaft, and adapted to cooperate with said abutting means for driving said disk; a disk of relatively low inertia mounted for free rotation relatively to said shaft, and adapted to control the other of said groups of switches; abutting means on said latter-mentioned disk; and a further member secured against rotation relatively to said shaft, and adapted to cooperate with said latter-mentioned abutting means for driving said latter-mentioned disk.

6. A speed responsive device for adjusting control means of the speed of a rotary system, comprising a rotary drum driven by said rotary system; surfaces in frictional cooperation with said drum; masses associated with said surfaces, subject to centrifugal force, and adapted to urge said surfaces away from said drum; pivotal supports carrying said masses; a shaft substantially secured against rotation relatively to said supports; spring means associated with said supports for urging said surfaces towards said drum; means for adjusting the stress of said spring means; a differential gear train associated on the one hand with said rotary system, and on the other hand with said shaft; a member cooperating with said differential gear train, adapted to move at a velocity corresponding to the differential velocity of said rotary system with respect to said shaft; two mechanical transmissions of different gear ratios between said member and said control means; a clutch in each of said transmissions; and clutch control means responsive to the directional components of the acceleration and velocity of said member for coupling the lower gear ratio transmission when said directional components of the acceleration and velocity of said member are in the same direction, and for coupling the higher gear ratio transmission when said directional components of the acceleration and velocity of said member are in the opposite direction.

7. A device according to claim 6, further comprising torque responsive means, on the shaft, for urging said surfaces towards said drum when the torque on the shaft increases, and away from said drum when the torque decreases.

8. A device according to claim 6, wherein the spring means and the means for adjusting the stress thereof, comprise a threaded sleeve mounted on said shaft and secured against rotation relatively to said supports; a nut screwed on said sleeve; a spring mounted on said sleeve and abutting at one end thereof against said nut; a piston abutment at the other end of said spring, associated with said supports for urging said surfaces towards said drum; connecting means between said nut and said rotary system for rotatingly driving said nut; a clutch in said connecting means; and means for controlling said clutch.

9. In a helicopter having a rotor carrying blades of variable pitch driven by an engine and provided with means for adjusting the pitch of said blades and means for adjusting the power output of said engine, a speed responsive device comprising a reference source of constant-velocity rotation; a differential gear train associated on the one hand with said rotor, and on the other hand with said reference source; a member cooperating with said differential gear train, adapted to move at a velocity corresponding to the differential velocity of said rotor with respect to said reference source; an epicycloidal gear train including a sun-gear, a planet-gear meshing with said sun-gear, a shaft fast with said planet-gear, a further planet-gear fast with said shaft, and a further sun-gear meshing with said further planet-gear, and substantially coaxial with said former-mentioned sun-gear; a lever freely supporting said shaft; pivotal supports for said lever substantially coaxial with said sun-gears; displaceable connecting means between said lever and one of said adjusting means; displaceable connecting means between said latter-mentioned sun-gear and the other of said adjusting means; abutting means for limiting the displacements of said connecting means; means for individually locking said connecting means against displacement; means for selectively controlling said locking means; two mechanical transmissions of different gear ratios between said member and said former-mentioned sun-gear; a clutch in each of said transmissions; and clutch control means responsive to the directional components of the acceleration and velocity of said member for coupling the lower gear ratio transmission when said directional components of the acceleration and velocity of said member are in the same direction, and for coupling the higher gear ratio transmission when said directional components of the acceleration and velocity of said member are in the opposite direction.

10. A device according to claim 9, wherein the former-mentioned connecting means connects the lever to the pitch adjusting means, whereas the latter-mentioned connecting means connects the latter-mentioned sun-gear to the power output adjusting means, and wherein the locking means corresponding to the power output adjusting means are urged into unlocking position, whereas the locking means corresponding to the pitch adjusting means are urged into locking position, the control means of said locking means being actuated for bringing the former-mentioned locking means into locking position, while simultaneously bringing the latter-mentioned locking means into unlocking position.

References Cited in the file of this patent

UNITED STATES PATENTS

| Number | Name | Date |
|---|---|---|
| 2,269,332 | Bench | Jan. 6, 1942 |
| 2,329,216 | Peters | Sept. 14, 1943 |
| 2,399,685 | McCoy | May 7, 1946 |
| 2,455,378 | McCoy | Dec. 7, 1948 |